United States Patent
Mader

(10) Patent No.: US 9,221,708 B2
(45) Date of Patent: Dec. 29, 2015

(54) METHOD AND DEVICE FOR TEMPERING GLASS

(75) Inventor: Leopold Mader, Neuhofen/Ybbs (AT)

(73) Assignee: LISEC AUSTRIA GMBH, Seitenstetten (AT)

( * ) Notice: Subject to any disclaimer, the term of this patent is extended or adjusted under 35 U.S.C. 154(b) by 0 days.

(21) Appl. No.: 14/112,558

(22) PCT Filed: Jan. 26, 2012

(86) PCT No.: PCT/AT2012/000012
§ 371 (c)(1),
(2), (4) Date: Nov. 5, 2013

(87) PCT Pub. No.: WO2012/142629
PCT Pub. Date: Oct. 26, 2012

(65) Prior Publication Data
US 2014/0053605 A1    Feb. 27, 2014

(30) Foreign Application Priority Data
Apr. 18, 2011 (AT) .................................. A 542/2011

(51) Int. Cl.
*C03B 27/048* (2006.01)
*C03B 27/04* (2006.01)
*C03B 35/24* (2006.01)

(52) U.S. Cl.
CPC ........... *C03B 27/048* (2013.01); *C03B 27/0404* (2013.01); *C03B 35/24* (2013.01)

(58) Field of Classification Search
USPC ........................................................ 65/25.2
See application file for complete search history.

(56) References Cited

U.S. PATENT DOCUMENTS

| 4,204,845 A | 5/1980 | Shields et al. |
| 5,334,234 A | 8/1994 | Anttonen et al. |
| 6,192,711 B1 | 2/2001 | Lisec |
| 2011/0020611 A1 | 1/2011 | Ando et al. |

FOREIGN PATENT DOCUMENTS

| DE | 18 11 435 | 10/1970 |
| DE | 2129704 | 2/1972 |
| DE | 69300713 | 4/1996 |
| EP | 0882682 A1 | 9/1998 |
| EP | 0 882 681 | 12/1998 |
| EP | 0 937 688 | 8/1999 |
| GB | 340108 | 12/1930 |
| JP | 5950033 A | 3/1984 |
| JP | 63154636 U | 10/1988 |

(Continued)

OTHER PUBLICATIONS

DE 1811435, Method and Device for Prestressing Glass Sheets, Ver Glaswerke GMBH, Oct. 1970, translation.*

(Continued)

*Primary Examiner* — Mark Halpern
(74) *Attorney, Agent, or Firm* — Young & Thompson

(57) ABSTRACT

For a device for tempering flat glass, the glass panes (1) are supported by air bearings on both sides between a heating zone (2) and a quenching zone (3). The nozzles (7), from which pressurized air for forming the air bearings escapes, are placed at an angle in such a way that the nozzles point away from the heating zone (2) and toward the quenching zone (3), whereby cooled air is prevented from flowing from the quenching zone (3) toward the heating zone (2).

10 Claims, 1 Drawing Sheet

(56) References Cited

FOREIGN PATENT DOCUMENTS

| | | |
|---|---|---|
| JP | 10338532 A | 12/1998 |
| JP | 111332 A | 1/1999 |
| JP | 2000044264 A | 2/2000 |
| JP | 2000103632 A | 4/2000 |
| JP | 2000290030 A | 10/2000 |
| JP | 2005162561 A | 6/2005 |
| JP | 2007005363 A | 1/2007 |
| JP | 2011026169 A | 2/2011 |
| SU | 939414 | 6/1982 |
| WO | 2010071178 A1 | 6/2010 |

OTHER PUBLICATIONS

Translation of Japanese Office Action, dated Oct. 29, 2014, from corresponding JP application.
International Search Report dated Apr. 23, 2012, corresponding to PCT/AT2012/000012.
Austrian Search Report dated Sep. 20, 2011, corresponding to the Foreign Priority Application No. 542/2011.

* cited by examiner

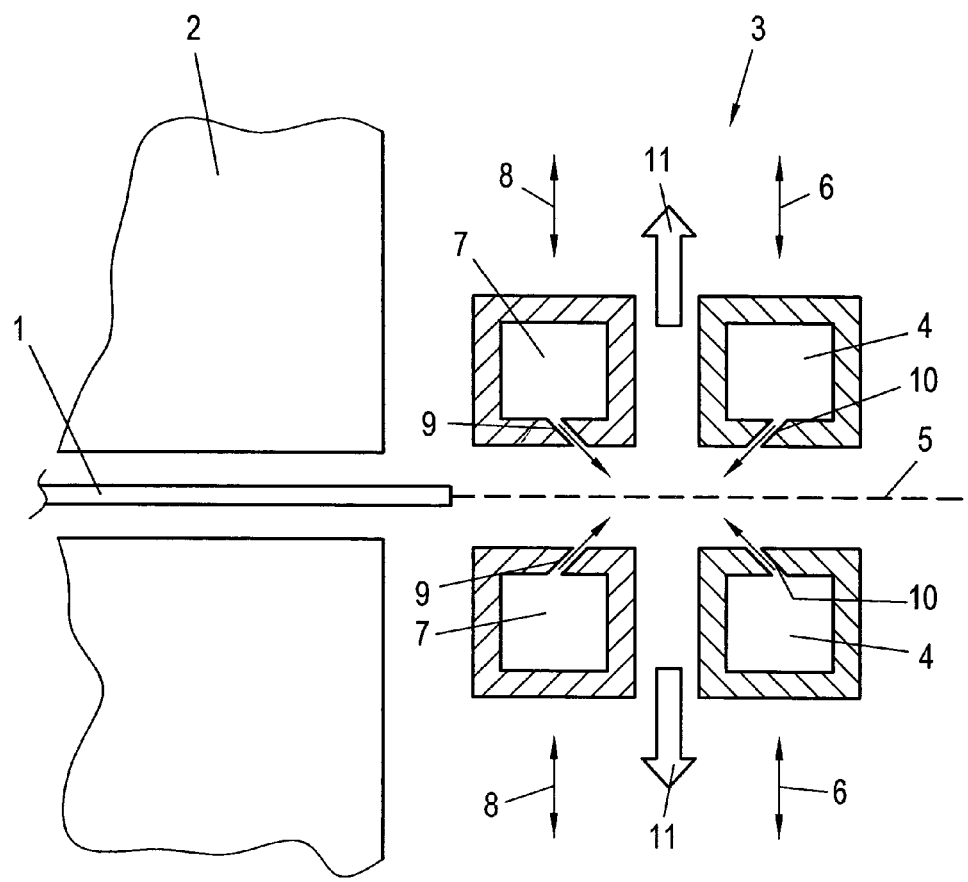

METHOD AND DEVICE FOR TEMPERING GLASS

This application is a 371 of PCT/AT2012/000012 filed 26 Jan. 2012.

The invention relates to a method for tempering flat glass and a device with which flat glass can be tempered.

BACKGROUND OF THE INVENTION

The tempering of flat glass is carried out such that the flat glass is heated to a temperature above the tempering temperature (in general approximately 650° C.) and then is quenched so that stresses tempering the latter are created in the flat glass.

For the tempering of flat glass, many devices have become known whereby a problem routinely exists in separating the heating zone from the quenching or cooling zone.

SUMMARY OF THE INVENTION

The object of the invention here is to propose a simple and effective solution.

This object is achieved according to the invention with a method that has the features of claim 1.

The object according to the invention is also achieved by a device that has the features of the independent claim that is oriented to the device.

Preferred and advantageous configurations of the invention are subjects of the subclaims.

Since, in the procedure according to the invention, the flat glass that protrudes from the heating zone is supported on either side by gas bearings, in particular air bearings, not only is the effective separation between heating and quenching zones provided, but also a gentle transport of the heated flat glass pane from the heating zone into the quenching zone is ensured.

The separation from the heating zone to the cooling zone is done especially effectively when the nozzles from which the gas exits for creating the gas bearings are placed obliquely so that they point away from the heating zone to the cooling zone. In addition, it can be provided within the framework of the invention that the nozzles for which the gases produce the quenching in the quenching zone are oriented in such a way that they are directed to the nozzles for the air bearings, whereby between the nozzles for creating the air bearings, on the one hand, and the nozzles for creating the quenching zone, on the other hand, a gap is provided, which allows gas (in general, air) to flow out.

Within the framework of the invention, it is taken into consideration to excite the nozzles (support nozzles), from which the gas that forms the gas bearings exits, into oscillations. It is thus achieved that pressure waves are created in the gas that advantageously support the reliable supplying of the flat glass pane to the quenching zone (for example, formed by at least one pair of quenching nozzles). The oscillations are preferably directed in such a way that the nozzles move crosswise, in particular normally (perpendicular), to the direction of movement of the flat glass pane. The oscillations can lie in the frequency range of ultrasound.

Other details and features of the invention follow from the description below of a preferred embodiment of the invention based on the diagrammatic drawing.

DETAILED DESCRIPTION OF THE PREFERRED EMBODIMENTS

In the arrangement according to the invention, a glass pane 1 (flat glass pane) from the heating zone 2, which is formed by, for example, a series of ceramic nozzles, from which heated gas (air) exits, is directed into a quenching zone 3, which is formed by at least one pair of nozzles 4, which are arranged on either side of the transport track 5 of the glass pane 1, which is to be tempered, and from which cooled gas (air) exits. The nozzles 4 that are provided in the quenching zone can be moved crosswise to the transport track 5 (arrow 6), in such a way that the distance of the nozzles 4 from one another can be matched to the thickness of the glass pane 1 that is to be tempered.

Between the heating zone 2, formed by ceramic nozzles, on the one hand, and the quenching zone 3, formed by at least one pair of quenching nozzles 4, on the other hand, at least two nozzles 7 (support nozzles) that are opposite one another are provided according to the invention, from which nozzles a gaseous medium (air) exits in the direction toward the conveyor track 5 of the glass pane 1, which is to be tempered. The nozzles 7 are arranged in an adjustable manner crosswise (arrow 8) to the transport track 4 of the glass pane 1 that is to be tempered. Thus, air bearings that are arranged on either side of the glass panes 1 (in each case between a nozzle 7 and the glass pane 1) are formed.

The outlet openings 9 from which support nozzles 7, from which gas (air), which creates air bearings, exits, are oriented in such a way that they are placed obliquely away from the heating zone 2 [sic]. Thus, cooled gas from the quenching zone 3 is prevented from flowing through the heating zone 2 and impairs the effectiveness thereof.

In addition, it is achieved that the gas bearings (air bearings) that are created on both sides of the glass panes 1 can be designed effectively by moving the nozzles 7 crosswise to the conveyor track 5 of the glass pane 1 that is to be tempered up to a point where they are close to the latter.

These air bearings can be created in a preferred embodiment even between the glass pane 1 that is to be tempered and the quenching nozzles 4 (nozzles in the quenching zone 3), by the latter being accordingly moved close to the glass pane 1.

Also, the outlet openings 10 in the nozzles 4 of the quenching zone 3 are placed obliquely to the plane of the transport track 5 namely so that they are placed obliquely to the nozzles 7 for creating the air bearings. It can thus be achieved that gas (air) can flow outward between the support nozzles 7 and the quenching nozzles 4 (arrow 11).

In practice, the operation of the device according to the invention proceeds such that the support nozzles 7 and also the nozzles 4 in the quenching zone 3 are first arranged in a position (readiness position) away from the transport track 5 of the glass pane 1 that is to be tempered. Only when the front edge of the glass disk 1 exits from the heating zone 2 and moves between the support nozzles 7 are the latter brought closer to one another so that the gas bearings (air bearings) which stabilize and guide the latter are created on either side of the glass pane 1.

In practice, several pairs of support nozzles 7 can also be provided, such as several pairs of quenching nozzles 4. Pairs of support nozzles 7 can also be provided between pairs of quenching nozzles 4.

The support nozzles 7 can be made to oscillate independently of their adjustability in the direction of the double arrows 8, and therefore oscillation generators are assigned to the support nozzles 7 (not shown). The direction of the oscillations of the support nozzles 7 is essentially crosswise, in particular perpendicular, to the transport track 5 of the flat glass pane 1. The frequency of the oscillations of the support nozzles 7 can be in the ultrasonic frequency range.

Although in each case a series of outlet openings 9 or 10 is provided in the embodiment shown in the drawing in each support nozzle 7 and also in each quenching nozzle 4, two or more than two series of openings 9 and 10 can be provided in a modified embodiment in the support nozzles 7 and/or the quenching nozzles 4.

In the support nozzles 7 and/or the quenching nozzles 4, it is also considered to provide a slot or two or more than two slots for the release of gas instead of a series of openings 9 or 10. Also, such slots are preferably placed at an angle to the transport track 5 of the flat glass pane 1 such as is shown and described for the openings 9 or 10.

In summary, an embodiment of the invention can be described as follows.

In a device for tempering flat glass, the glass panes 1 between a heating zone 2 and a quenching zone 3 are supported on either side by air bearings. The nozzles 7, from which pressurized air exits to create the air bearings, are placed obliquely in such a way that they point away from the heating zone 2 to the quenching zone 3, by which it is prevented that cooled air from the quenching zone 3 flows in the direction toward the heating zone 2.

The invention claimed is:

1. A method for tempering flat glass, comprising:
    heating flat glass in a heating zone up to a tempering temperature; and
    quenching the heated glass in a downstream quenching zone,
    wherein, between the heating zone and the quenching zone, the glass pane is supported on either side by gas air bearings.

2. The method according to claim 1, wherein the air bearings are created between support nozzles and the glass panes.

3. The method according to claim 2, wherein the support nozzles, from which gas exits to create gas air bearings, are put into operation as soon as a front edge of the glass pane that is to be tempered arrives in an area of the support nozzles.

4. The method according to claim 3, wherein gas in the quenching zone flows in the direction toward the support nozzles.

5. The method according claim 3, wherein the support nozzles are excited into oscillations that are directed crosswise to a direction of movement of the flat glass.

6. The method according to claim 2, wherein gas in the quenching zone flows in a direction toward the support nozzles.

7. The method according to claim 6, wherein the support nozzles are excited into oscillations that are directed crosswise to a direction of movement of the flat glass.

8. The method according to claim 2, wherein gas from the support nozzles and from the nozzles of the quenching zone flows out into an area between the support nozzles and the nozzles of the quenching zone.

9. The method according to claim 8, wherein the support nozzles are excited into oscillations that are directed crosswise to a direction of movement of the flat glass.

10. The method according to claim 2, wherein the support nozzles are excited into oscillations that are directed crosswise to the direction of movement of the flat glass.

* * * * *